March 29, 1949.  A. C. HARTLEY ET AL  2,465,587
FOG FREEABLE RUNWAY FOR AIRCRAFT
AND PLANTS ASSOCIATED THEREWITH
Filed Feb. 8, 1946  8 Sheets-Sheet 1

Inventors: A.C.Hartley; J.C.Brown;
G.S.Callendar; H.R.Fehling; D.A.Fox; F.Gill;
W.T.Moore; P.O.Rosin and G.J.Williamson
By Haseltine Downing & Lake Attys.

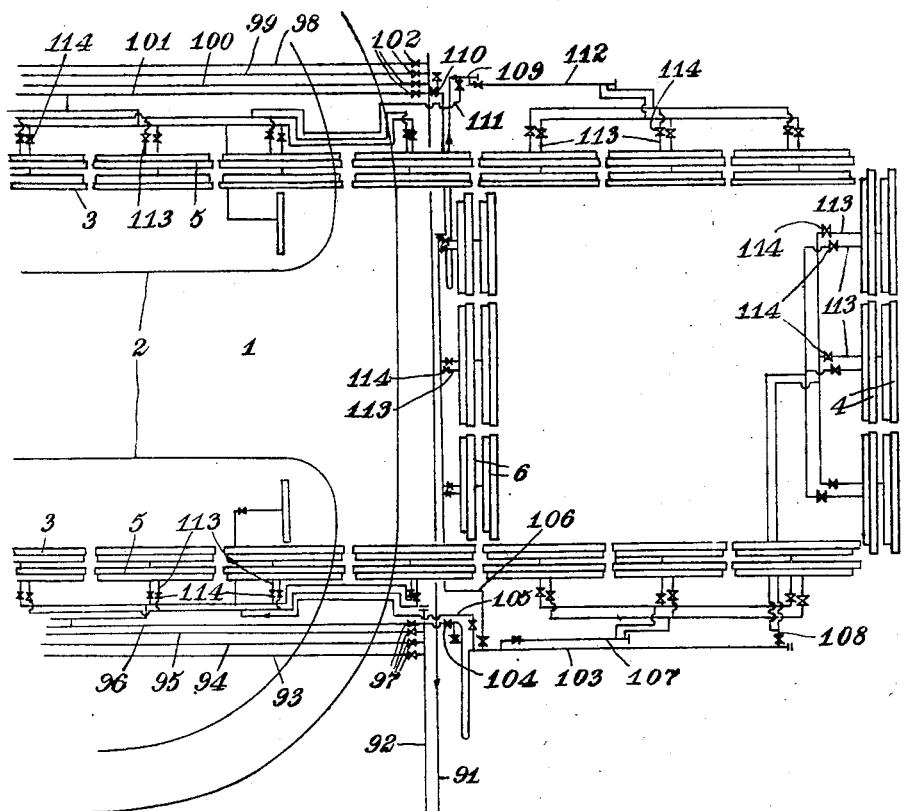
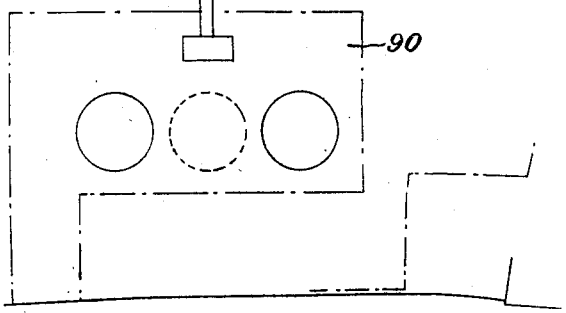
Fig. 2.
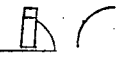

March 29, 1949.　　A. C. HARTLEY ET AL　　2,465,587
FOG FREEABLE RUNWAY FOR AIRCRAFT
AND PLANTS ASSOCIATED THEREWITH
Filed Feb. 8, 1946　　8 Sheets-Sheet 3
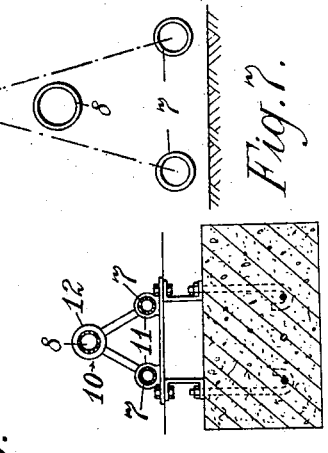
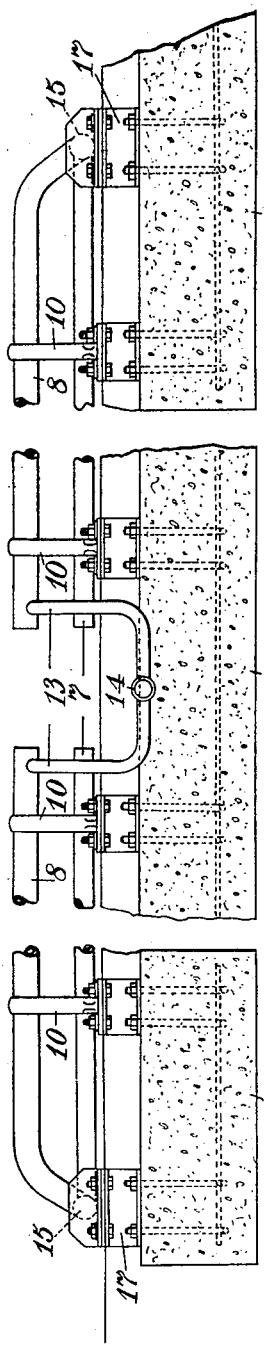
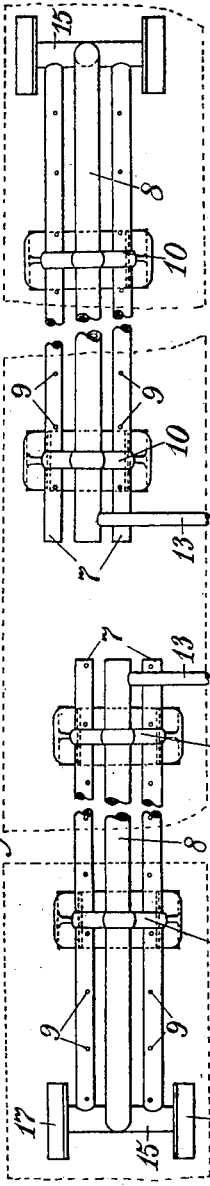
Inventors: A.C.Hartley; J.C.Brown
G.S.Callendar; H.R.Fehling; D.A.Fox; F.Gill;
W.T.Moore; P.O.Rosin and G.J.Williamson
By Haseltine Lake Downing & Seibold Attys.

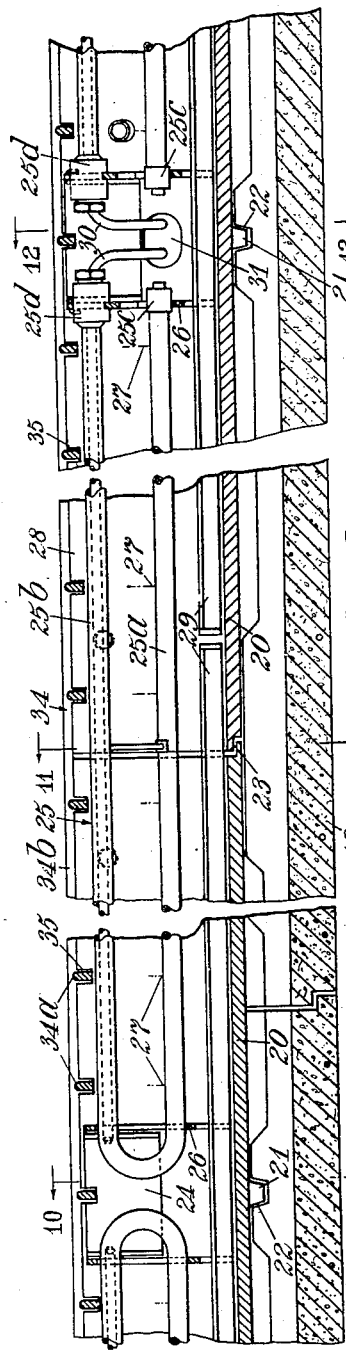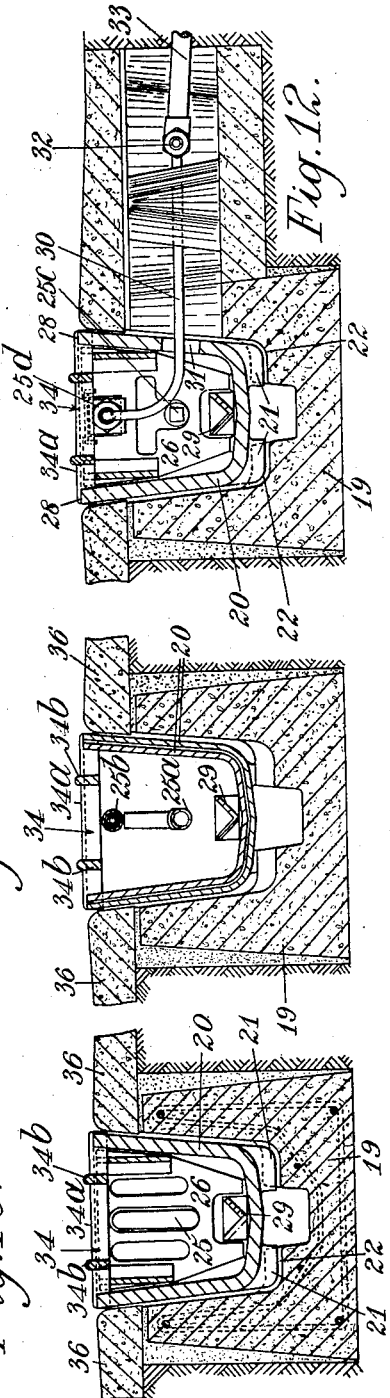

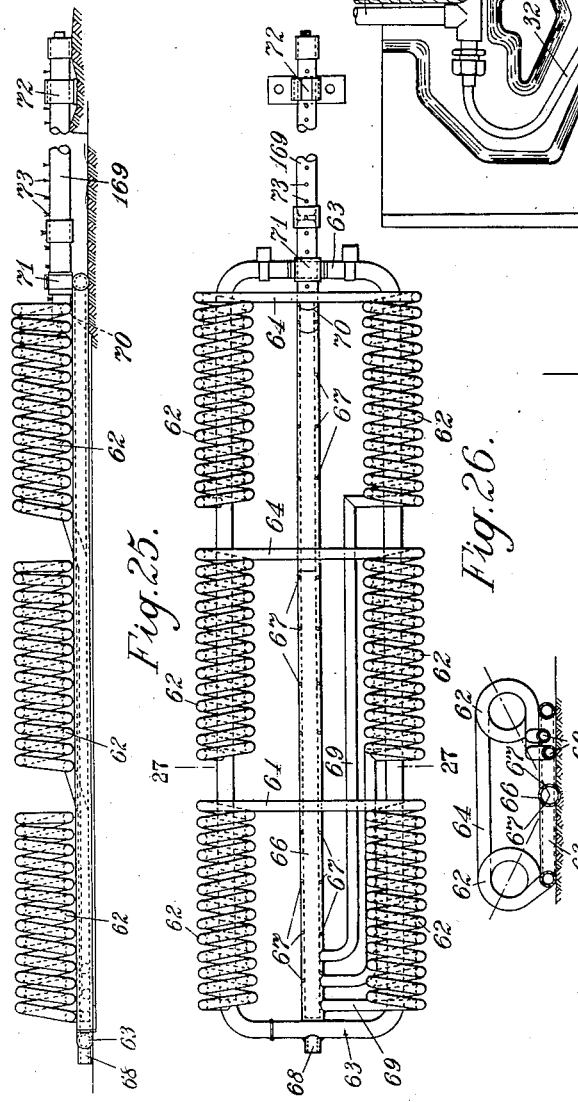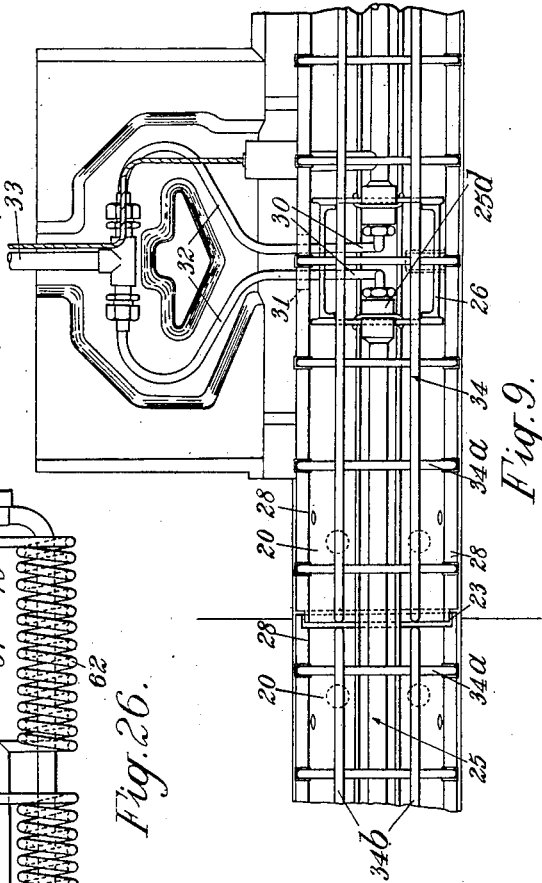

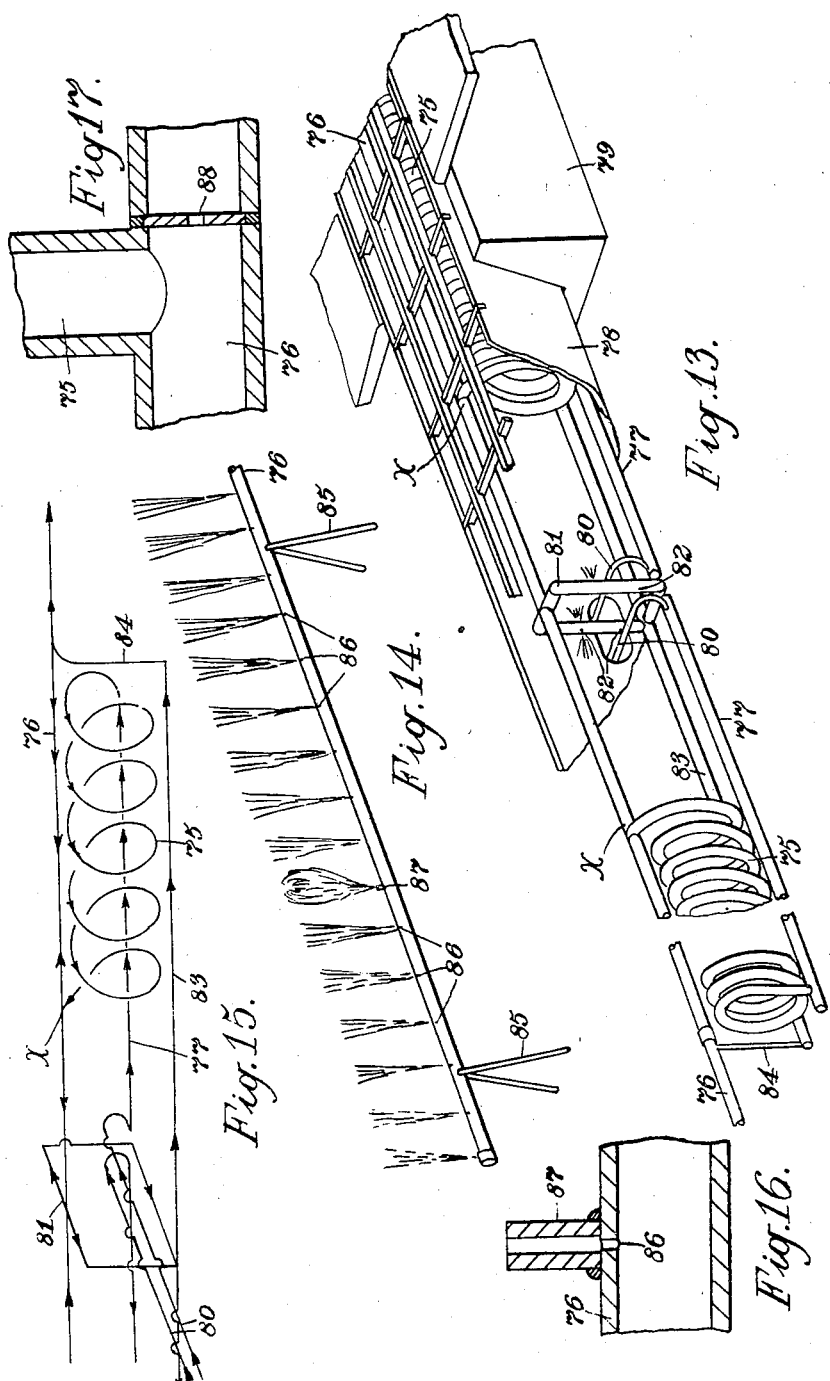

March 29, 1949.
A. C. HARTLEY ET AL
2,465,587
FOG FREEABLE RUNWAY FOR AIRCRAFT
AND PLANTS ASSOCIATED THEREWITH
Filed Feb. 8, 1946
8 Sheets-Sheet 7
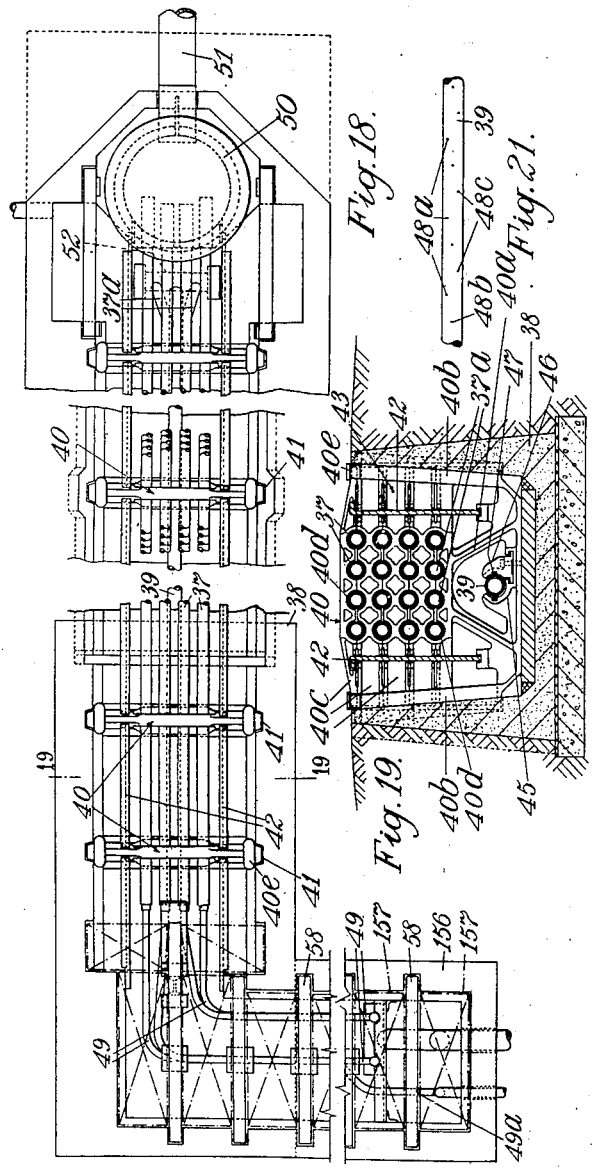
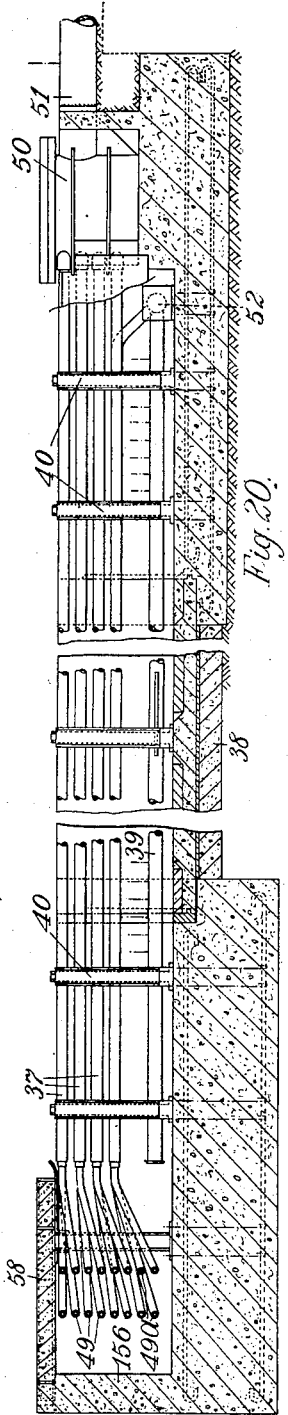
Inventors: A. C. Hartley; J. C. Brown;
G. S. Callendar; H. R. Fehling; D. A. Fox; F. Gill;
W. T. Moore; P. C. Rosin and G. J. Williamson
By Glascock Downing etc. Attys.

March 29, 1949.   A. C. HARTLEY ET AL   2,465,587
FOG FREEABLE RUNWAY FOR AIRCRAFT
AND PLANTS ASSOCIATED THEREWITH
Filed Feb. 8, 1946                              8 Sheets-Sheet 8

Inventors:
A. C. Hartley
J. C. Brown
H. R. Fehling
G. S. Callendar
D. A. Fox
F. Gill
W. T. Moore
P. O. Rosin
G. J. Williamson
By Elsworth Downing Whetzel
Attys.

Patented Mar. 29, 1949

2,465,587

UNITED STATES PATENT OFFICE 2,465,587

FOG FREEABLE RUNWAY FOR AIRCRAFT AND PLANT ASSOCIATED THEREWITH

Arthur Clifford Hartley, London, John Cecil Brown, Billingham, Guy Stewart Callendar, Horsham, and Hans Reinhard Fehling, Denys Anthony Fox, and Frank Gill, London, and William Thomas Moore, Billingham, Paul Otto Rosin, London, and Gerald Johnstone Williamson, Billingham, England, assignors to the Minister of Supply in His Majesty's Government of the United Kingdom of Great Britain and Northern Ireland

REISSUED

JUN 6 1950

RE23238

Application February 8, 1946, Serial No. 646,420
In Great Britain February 24, 1945

18 Claims. (Cl. 244—114)

This invention relates to the dispersal of fogs of the type wholly or mainly composed of moisture in the form of water droplets. It is well recognised that fogs constitute a menace to the landing of aircraft, so much so in fact that the decision to dispatch aircraft may entirely depend upon the visibility at their destination or the visibility conditions likely to obtain on their return to their departure station.

The aim of the present invention is to provide a fog freeable runaway or alighting lane such that the landing or alighting strip, including the immediate approach, may be cleared of fog over the whole or an adequate length thereof to an appropriate height for example to afford a ceiling of 80–100 feet, and obtain sufficient visibility for effecting safe landings.

The invention is based upon the principle that fog is capable of dispersal by the generation of sufficient heat units to evaporate the fog-forming droplets in the vicinity to be cleared.

This invention consists in a fog freeable aircraft runway comprising a landing strip and burner lines (preferably for fluid fuel) extending longitudinally parallel with but spaced from said strip and transversely across the approaches to afford a linear heat source or frame by the consumption of fuel in the burner lines at a rate to develop that number of therms per yard per hour capable of producing a fog-free tunnel or rift over the landing strip.

The term "landing strip" is used to denote that part of a runway having a prepared or defined permanent or temporary alighting surface.

For the major length of a landing strip of a runway single burner lines are adequate but at the approach ends, where a higher ceiling of dispersal is required, a rectangular burner frame, each side of which comprises double lines, is advisable in order to provide additional heat.

The whole or substantially the whole of the burners enclosing the landing strip may be required to be brought into operation in calm weather conditions, while in certain wind conditions a selected line (or lines) of burners may be effective to disperse the fog by constituting a heat screen (or screens) upon the windward side only of the landing strip. For dealing with fogs in strong cross winds it may be necessary to install an auxiliary line of burners disposed outside the normal lines parallel with the longitudinal margins of the landing strip in order to ensure that the displacement of the vertical heat effect caused by the wind shall operate over the landing strip.

The principle underlying the invention applies equally to sea fogs and the landing of sea planes as to land fogs and land planes (i.e. aircraft capable of alighting on the ground, landing strips or solid platforms) but physical or mechanical difficulties exist in connection with the installation and maintenance of plant in water areas, and consequently the application of the invention will hereinafter be confined with respect to runways for land planes.

While according to the invention gaseous fuel could effectively be used, particularly where natural gas is available, it is more feasible for normal installation to employ liquid hydrocarbon fuel, of which class a volatile liquid such as gasolene has been found to be suitable. Appropriate fuels are hereinafter referred to as liquid fuels.

In order to disperse fog, it is essential to develop a smokeless flame, and where a large installation—consuming vast quantities of liquid fuel for the required heat—is concerned, the successful vaporisation and combustion of liquid fuel presents difficulties. It was at first thought that the adoption of the vaporiser blowlamp principle was not practicable. However, after extensive experiment it was found that by the adoption of certain jet sizes and relative dimensions and disposition of the burner jet and vaporiser elements, vaporisation could be successfully secured by the direct impingement of a longitudinally extending series of jet flames upon a coextensive vaporiser element or elements, and that high velocity stable, smokeless, highly or partially, luminous flames could be promoted, while by the introduction or induction of auxiliary air, stable practically colourless, or colourless or Bunsen flames could be ensured.

Accordingly the invention also consists in burner plant comprising burner piping having jet orifices in a series extending longitudinally thereof, and substantially coextensive vaporiser piping through which liquid fuel is passed to the burner piping and upon which the flames from said jets are directed to act or impinge.

The amount of heat required from fog dispelling burner jet lines to disperse fog will vary according to the density of the fog and the prevailing wind and atmospheric conditions, between a minimum of approximately 10 therms/yd./hr. and a maximum in the neighbourhood of 60 therms/yd./hr. For the average installation all burners should have a normal upper heat output of 30 therms/yd./hr. capable of reduction to 20 or 10 therms/yd./hr., or to be run at maximum of, say, from 35–40 therms/yd./hr. or more for wider runways. At the double burner lines at the landing approaches fuel consumption should be capable of being raised as high as 80 therms/yd./hr.

The burner pipes may be laid above ground, the overall height being kept to a minimum, or they may be laid in a trench so that no impediment is offered to the freedom of movement of grounded aircraft. Burner piping located below ground level may be housed in cast iron troughs which act as heat storage capacities, so that after the burners have been in operation for a time and have been subsequently shut down, they may be again started up at any time during the following hour or thereabouts without priming as the residual heat is sufficient to produce vaporisation upon the resupplying of liquid fuel.

Troughed burners also enable a construction to be adopted whereby colourless or partially colourless flames can be utilised, if desired, by the induction and premixing of combustion air at the vapour jets.

Another form of plant according to the invention comprises long burner pipes above or below ground level fed with vaporised or gaseous fuel from a separate vaporising source. The vaporising equipment may be either remote from the burner line or may form part of the fog dispersing system. In the latter case, the heat evolved in the vaporising plants in excess of that required for vaporising the fuel fed to the burner line is available for fog dispersal.

The vaporiser plant may be of blowlamp principle already indicated or may comprise a tubular boiler through which the fuel to be vaporised is passed and a furnace fed either from a separate fuel supply or with part of the fuel vaporised in the boiler.

The burner pipes of each plant are drilled at suitable intervals along their length and hole sizes are so arranged to provide sympathetic lighting of the flames. Special stabilising jets may be provided, which remain alight under adverse atmospheric conditions, and facilitate relighting of the other jets if these are extinguished.

Where the burner lines are above ground certain interruptions are provided for the ingress and egress of aircraft but it will be appreciated that every interruption constitutes a potential ingress area for fog and consequently their width should not be greater than that required for the passage of aircraft and the number of interruptions should be limited.

Long lengths of burner and vaporiser pipes which are subject to expansion and contraction due to the temperature changes, are liable to cause difficulties, and in order to solve this problem vaporiser and burner piping is anchored or secured at a single point in its length—midway, or at one end only, thereby causing movement to take place freely either in opposite directions or in one direction away from the anchorage.

Alternatively, more than one anchorage may be employed, and expansion and contraction accommodation bends in the piping or equivalent devices may be introduced as required in a unit or section.

The invention includes the provision of means for selectively controlling various burner lengths or lines in order to adjust both the disposition of the heat and the heat units to be liberated, with respect to the landing strip, most effectively and economically, according to the prevailing meteorological conditions affecting the dispersal of fog—which include wind speed and direction, temperature structure of the lower atmosphere, and the water content droplet size distribution of the fog.

Hand controlled valves and automatic valves of known type for regulating the liquid fuel supply including limitation of the pressure so that such does not exceed a predetermined maximum and further cutting off the supply should the pressure fall below a predetermined minimum are provided, and in large installations, particularly in those of a permanent character, it is desirable to employ means for exercising remote control and indicating means adapted to take care of the priming, lighting of the burners and indicating whether any particular line or burner section is alight or not.

In the accompanying drawings which exemplify the invention:

Figure 2 is a fragmentary enlarged diagrammatic plan of a box burner frame alighting end of the runway as seen in Figure 1.

Figures 3 and 4 are respectively a plan and elevation of a burner unit (described hereinafter as the "triangular burner"), a series of which are employed according to one form of burner plant suitable for location above ground level on a runway, while Figure 5 is an end elevation and Figure 6 a cross section thereof.

Figure 7 is a diagram indicating the vaporised jet location with respect to the vaporiser piping arrangement seen in Figures 3 to 6.

Figure 8 is a fragmentary side elevation and Figure 9 a corresponding fragmentary plan of another form of burner unit or section (described as the "trough" burners) suitable for location below ground level of the runway.

Figures 10, 11 and 12 are sections taken respectively on the lines 10, 11, 12 of these figures.

Figure 13 is a fragmentary isometric view of another form of trough burner burner unit according to a modification of the invention.

Figure 14 is a fragmentary isometric view showing a continuation of the burner pipe illustrated in Figure 13.

Figure 15 is a diagram of the fuel circulation in the burner seen in Figure 13.

Figure 16 is a detail sectional view of a stabiliser jet exemplified in Figure 14.

Figure 17 is a detail sectional elevation illustrating the positioning of a restricted orifice plate controlling the vapour flow.

Figure 18 is a plan view of the vaporiser element of a form of independent vaporiser and burner conduit plant, according to the invention, for a runway.

Figure 19 is a cross section of the element seen in Figure 18 taken on the line 19—19.

Figure 20 is a side elevation of the element according to Figure 19.

Figure 21 is a detail of the vaporiser heater element of Figure 19.

Figure 25 is a fragmentary side elevation and Figure 26 a plan of transportable burner plant embodying an independent vaporiser and burner pipeline according to a modification of the invention, and Figure 27 is a cross section taken on the line 27 of Figure 26.

Figure 1:
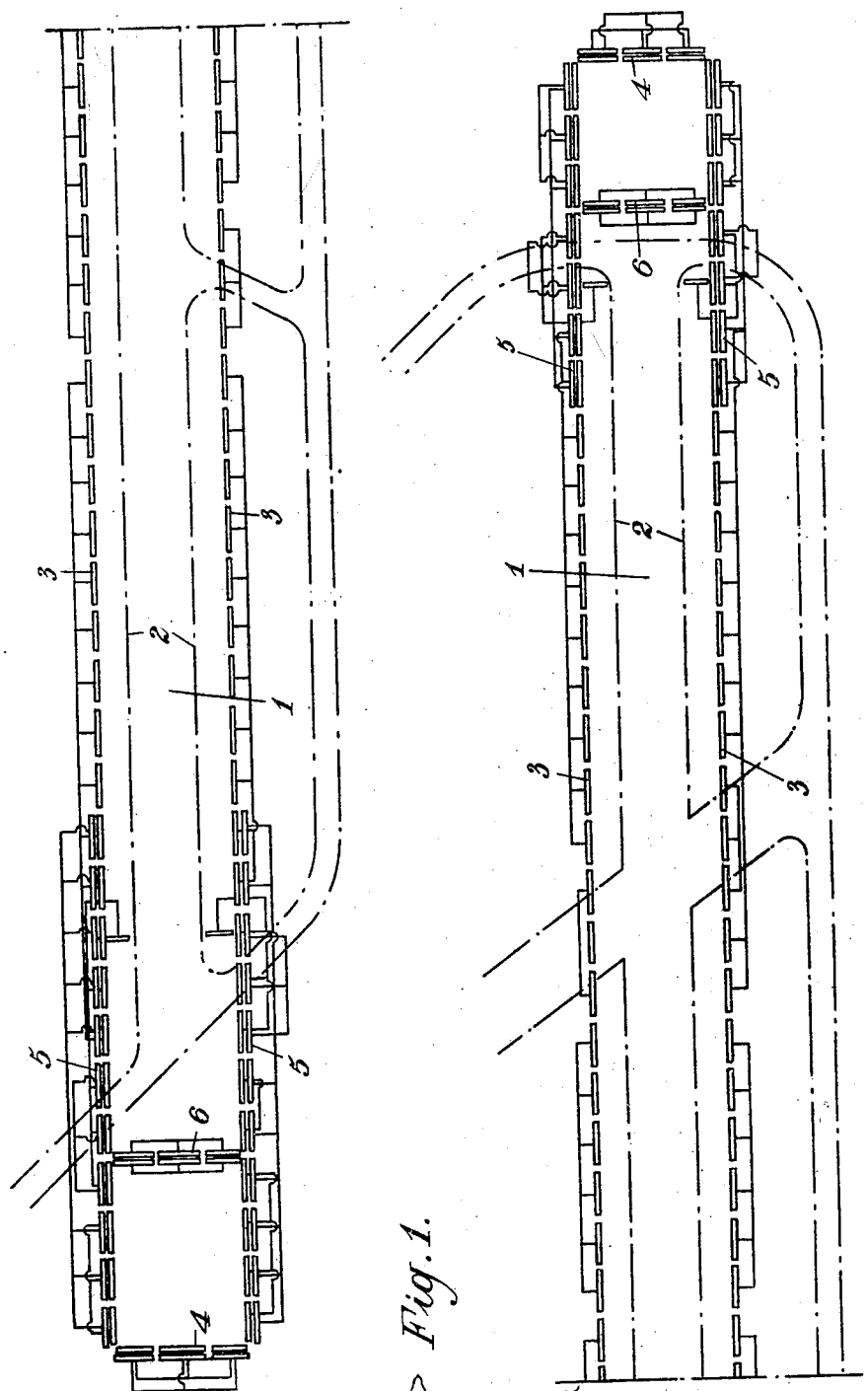
Figure 1 is a diagrammatic plan, in two fragments, illustrating a runway according to the invention with the landing strip and lines of burners and supply piping represented.
Figure 22:
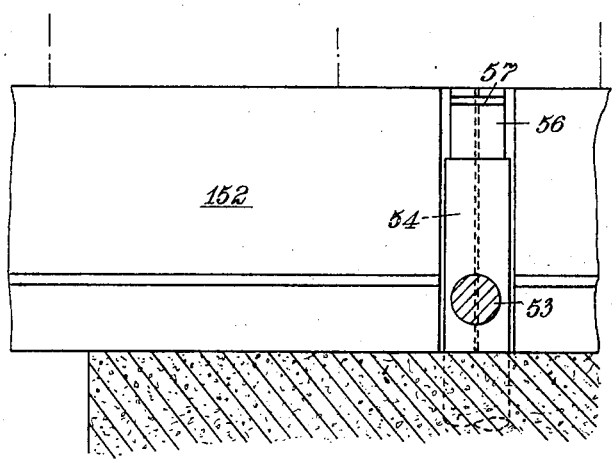
Figures 22, 23 and 24 are respectively a side elevation, a plan and a cross section of a fragment of burner jet conduit such as seen on the right of Figure 18.
Figure 23:
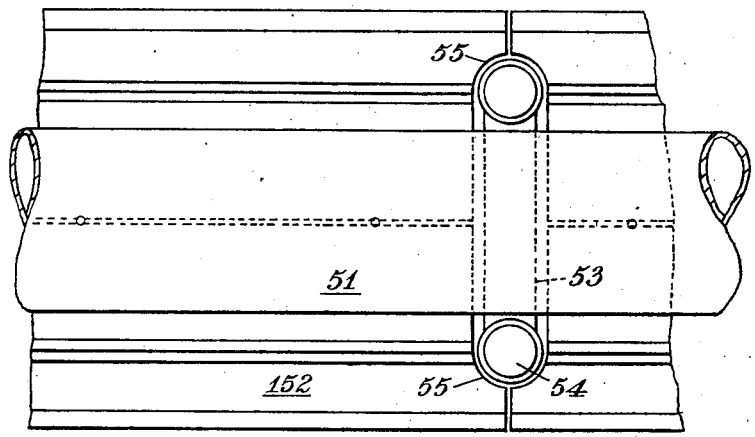
Figure 24:
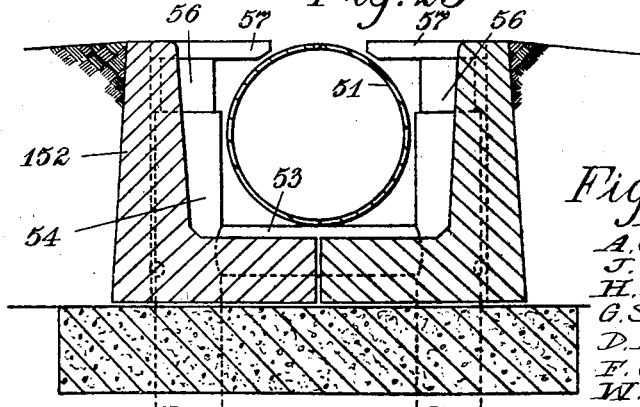

In carrying the invention into effect according to one mode, as described by way of example, the runway comprises a landing strip 1 (see Figure 1) of the length and width required for the type of aircraft it is intended to receive. Parallel with the strip and spaced from the lateral margins 2 thereof a burner line heat source 3 is laid at a distance not substantially less than 50 yds. from each of said margins, and this pair of burner side lines is substantially continuous and coextensive with the landing strip except for any gaps that it may be necessary to provide for the ingress and egress of grounded aircraft to and from said strip. Each extremity of the landing strip has double burner lines 4 arranged transversely thereacross. It will be appreciated that the landing strip area is thus enclosed by the side and transverse burner lines, which in effect form a burner heat source frame.

Supplementary burner lines 5 are laid, which are additional to and adjacent the side burner lines 3, along the approach ends extending a suitable distance inwards from the terminal lines. From the inward ends of the doubled part of the side burner lines and joining them together a second transverse double burner line 6 is laid to complete a rectangular heat box of greater intensity at the approach end portions of the landing strip in order to ensure good visibility from whichever direction longitudinally aircraft approach the strip.

It will be appreciated that the position of the second or inward double transverse line of burners 6 is dependent upon the point at which the aircraft touch down as this transverse line should be crossed before the aircraft alight. A suitable distance for the second line has been found to be about 160 yds. from the first or terminal transverse double burner line 4.

In order to ensure that the heated zone shall cover the landing strip even in cross winds of, say, 20 miles per hour, and prevent the wind blowing the heated air so that the ceiling of the fog free area is displaced beyond the landing strip, an auxiliary outer burner line may be installed, spaced from the centre of the landing strip about 250 yds. This line may be brought into the heat frame by extending the transverse burner lines outwardly.

The burner plant according to one example, see Figures 4–7 (hereinafter referred to as the "triangular burner") in which the fog dispelling flames also serve for vaporising the liquid fuel on its way to the jets from which said flames issue, comprises vaporizer piping in communication with burner piping. The piping is laid in sections or units of suitable length for feed and operational purposes and are placed end to end to constitute the burner lines framing the landing strip as referred to above.

Each unit consists of a pair of burner pipes 7 each composed of united lengths of steel tubing of 1½ inches, the axes of the pair of pipes being spaced apart horizontally about 7 inches.

Vaporiser piping 8 composed of united lengths of steel tubing of 2 inches diameter is positioned above and runs coextensive with the burner piping 7 with its axis in the mid-vertical plane between the axes of the pair of burner pipes, so that the axes of the vaporiser and burner pipes 8 and 7 lie at the corners of an equilateral triangle, as viewed in cross section.

The burner pipes 7 are bored with jet orifices 9 about $\tfrac{1}{16}$ of an inch. These jets are positioned at 4-to-6-inch intervals throughout the length of each burner pipe. The jet bores 9 are positioned so that the jets are directed upwardly and inwardly towards the vaporiser pipe 8 and the axis of each bore 9 is directed clear of the outer side of the vaporiser pipe 8 by about ½ inch with a view to causing one or other set of the jet flames to impinge satisfactorily on the vaporiser piping and effect vaporisation of the liquid fuel supplied thereto (under a pressure of about 25 lbs.), whatever the wind condition and direction may be, while in calm conditions or light winds the jets of both pipes impinge upon the vaporiser pipe.

The vaporiser and burner pipes 8 and 7 are positioned in their triangular relationship by a series of transverse apertured plates or frames 10 (called spreaders) conveniently spaced at 6 foot intervals longitudinally. The pipes 7 and 8 pass through the apertures 11 and 12 of the spreaders and are adapted to slide under expansion and contraction conditions.

The longitudinal vaporiser-burner lines parallel with the landing strip and elsewhere are made up, as noted above, in units or sections suitable for feeding, combustion and operational conditions. According to one arrangement a vaporiser-burner unit is about 120 feet in length and is formed in two sections A and B arranged end to end, the inner ends of the vaporiser pipes 8 being served by branch pipes 13 from a common feed pipe 14, while each of the burner pipes 7 at their outer ends are in fluid communication with the adjacent ends of the vaporiser pipes by means of a transverse pipe 15, the other inner ends of each burner pipe being closed. According to this arrangement it will be seen that at their outer ends the vaporiser pipes 8 are united to the admission end of the burner pipes 7 so that relative longitudinal displacement between the burner and vaporiser pipes can take place and any distortion due to expansion or contraction is avoided, while vaporiser fuel has free access to the burner pipes from the vaporiser pipe. The transverse header or union pipe 15 is anchored to a concrete foundation block 16 by angles 17, the inner ends of the pipes 7 and 8 being free for expansion or contraction.

A pair of spreaders 10 for each section (of which only one is shown) is located adjacent the inner ends and mounted in concrete blocks 18 and a spreader 10 is fixed to the block 16 adjacent each anchored end. Elsewhere the spreaders may be secured to the ground merely by spikes.

According to another form of burner plant in which the burner fog dispersing jets are again also used as vaporiser jets with the vaporiser pipes coextensive with the burner pipes, see Figures 8–12, both pipes are located in a trough below ground level so that the burner line installation offers no obstruction to the free passage of grounded aircraft across the burner lines. These vaporiser-burners are hereinafter referred to as "trough burners."

Precast sectional concrete channels 19 are sunk in the ground along the burner lines parallel with the margins of the landing strip and are similarly sunk for the transverse burner lines. The concrete channels are adapted to receive cast iron trough sections 20 about 3 ft. 6 in. long and about 8-9 in. in width and depth, fitted together end to end to constitute a continuous trough. The under sides of the iron trough sections 20 are provided with transverse lugs 21 disposed centrally of their length and are adapted to engage in corresponding slots 22 in the concrete channels 19 in order to prevent cumulative unidirectional creep of the iron troughs due to the alternate expansion and contraction under heating and cooling conditions. The joints 23 at the ends of the troughs 20 overlap and have clearances to accommodate expansion of the troughs from their centre outwardly. These cast iron troughs 20 operate as heat storage capacities and retain heat over a period as above indicated, which may be utilised in restarting without priming.

The continuous iron trough formed by the sections 20 is fitted with vaporiser-burner units arranged end to end with a suitably short interval or space 24 between each end of a unit and the next. Each unit comprises an oppositely disposed pair of 1 inch diameter steel pipes 25, each in the form of a U tube or hair-pin of about 10 ft. in length. The limbs 25a, 25b of the hair-pin form are arranged in the central vertical plane of the trough 20 and are supported and located within the trough in frames or boxes 26 apertured to accommodate the piping. The upper limb 25b of each hair-pin form functions as a vaporiser for the burner pipe limb 25a below it. The burner limb 25a is provided with jet bores 27 of about $\frac{1}{10}$ inch diameter at 6-inch intervals which are adapted to direct the fog dispelling and vaporising jet flames upwardly in the mid-vertical plane so as to impinge upon the vaporiser pipe limb 25b.

The axis of the vaporiser pipe limb 25b is located about 1½ inches below the horizontal plane of the lips 28 of the iron trough 20 and the vertical distance separating the axis of the burner pipe limb 25a from the axis of the vaporiser pipe limb 25b is about 3¾ inches. Under operating conditions liquid fuel is supplied at a pressure of 20-40 lbs. per sq. inch.

For priming purposes the burner units are provided with a fuel catchment tray 29 below the burner pipe limb.

The adjacent ends 25c of the burner pipe limbs 25a of a unit are closed whilst the adjacent ends 25d of the vaporiser pipe limbs are each connected to a short U-shaped feed section of pipe 30 extending through an aperture 31 in the trough and which is coupled by a T union 32 upon a common fuel feed pipe 33 for the two vaporiser-burner elements comprising a burner unit.

The adjacent inward ends of the hair-pin elements 25 are located in a support casing or box 26, the arrangement being such that expansion of the elements takes place outwardly from this box, while the outward rounded hair-pin ends of adjacent units are carried in a similar box 26 common to the adjacent rounded ends so as to permit relative movement.

Units may be grouped together for feed purposes in pairs for forming burner line sections of about 70 yds. long, each pair of units being served by a common feed branch supplied from a trunk from which the sections are fed from the liquid fuel supply main.

With a view to facilitating the transit of grounded aircraft across the burner trough a grid 34 is provided over the trough mouth. The lips of the trough are provided with a series of slots 35 spaced apart about 6 inches and in register with the burner jets, and are adapted to receive transverse grid bars 34a which are secured as by welding to longitudinal grid bars 34b.

The width of the troughs 20 and the central position of the vaporiser-burner piping 25 are such as to leave ample clearance for the ingress of combustion air for the burner jets over the lips of the trough, and in normal wind or calm conditions the jet flame is of a stable, highly luminous character.

A partially colourless or a colourless or Bunsen flame may be produced in trough burners by arranging for the burner jet to operate with an injection action calculated to induce auxiliary air to flow to the jets below the base of the flames so that there is a premixing of vapour and air. This action may be produced by suitably locating the longitudinally extending grid bars 34b (vertically positioned and laterally spaced from the jet orifice vertical plane) between which the base or lower portion of the flame is located whereby the high velocity flame is caused to issue through an induction slot and draw in air through the slots formed at each side between the bars 34b and the lips 28 of the trough.

The longitudinal grid members 34b may be about ½ inch in thickness and 1½ inches in depth and spaced apart about 4½ inches and located equally from both sides of the central plane of the troughs. Vaporiser-burners provided with this induction air arrangement are referred to hereinafter as "trough slot burners."

Seated at the edge of the concrete channel and adjacent and flush with the lips of the trough, a continuous run of concrete slabs 36 may be laid in order to provide a firm edging for traffic.

An economiser pipe comprising a U tube arranged at the lower part of the trough 20 so that legs thereof are adjacent the sides of the trough may be provided into which the liquid fuel is passed from the feed pipe 30 before it passes into the vaporiser limb 25a. Such economiser pipe may extend substantially the whole length of the vaporiser burner unit 25.

According to another form of plant adapted to be located in a metal trough (see Figures 13-17) the unit or assembly comprises a pair of spaced vaporiser coils 75 each formed of ¾" bore tube and consisting of 27½ turns at 1⅜" pitch. These coils vaporise the oil and feed it to a top burner pipe 76. The oil is fed into the coils from pipes 77 lying at the bottom of the metal trough 78 which is located in a concrete trough 79. The pipes 77 are fed by transverse feed pipes 80 connected to a common feed (not shown).

A vaporiser burner is located between the coils 75 and comprises a ring 81 mounted in a vertical plane and provided with horizontal jets 82 on both sides, there being four jets on each side.

The feed to the burner ring 81 is obtained by connecting the ring to the top burner pipe 76, the feed being in vapour form.

A secondary feed to the burner pipe 76 is provided by means of the pipe 83 which communicates with the burner ring 81 and from which a riser pipe 84 is connected to the pipe 76 adjacent the liquid phase end of the coil 75.

The burner tube 76 is supported in the trough upon spaced tripods 85 and is drilled at 6"

intervals with Morse No. 46 holes 86. Each burner tube 76 is provided with a stabiliser jet 87 approximately 2 ft. 6 inches from one end. Such jet consists of ⅛" gas piping ¾" long welded over one of the jet holes 86. The stabiliser jets are provided so that if owing to adverse wind conditions, the flame is blown off a number of the jets 86, the stabiliser jet continues to burn and thus reignites the blown out jets.

Each burner tube 76 is provided with an orifice plate 88 (see Figure 17) having an orifice of about ⅛" located at a position marked X, i. e. between the point where the vaporising coil 75 communicates with the burner tube and the point where the pipe 76 communicates with the vaporiser burner 81.

These orifice plates control the amount of vapour being fed into the burner tubes in proportions suitable for effecting even flame lengths at all parts of the burner tube.

Orifice plates are also fitted at the feed end of the pipes 80 the function of these being to eliminate the possibility of burner surge due to the employment of "once through" type vaporiser coils. The employment of orifice plates in the feed pipe 80 also has the advantage of ensuring less possibility of the burner being overloaded and producing smoke.

The flow of oil and vapours is shown by the arrows in the diagram Figure 15.

In carrying out the invention according to another example employing a burner plant in which the fog dispersing jet flames of the burner lines are not employed also to provide the vaporising source of heat (although vaporisation is produced by a longitudinal set of burner jets impinging upon vaporiser tubing), a vaporiser section or unit line is installed from which burner piping (called the burner jet conduit) for producing the fog dispersing flames extends and is laid on the runway burner lines.

This form of vaporiser unit with its burner jet conduit may be conveniently referred to hereinafter as "the independent vaporiser and burner conduit plant," the vaporiser part with its set of burner jets being styled "the vaporiser element."

The vaporiser element comprises a bank or stack of vaporiser tubes 37 (Figures 18–24) and a burner jet heat source arranged in a concrete trough 38 about 3 ft. wide and 2 ft. 2 inches deep, sunk in the ground. The concrete channel may conveniently be composed of precast sections. The metal piping and associated metal parts operate as heat storage capacities in a similar manner to that above indicated in connection with the trough or trough slot burner plant and enable the vaporiser elements, after use, to be restarted without priming.

The bank of vaporiser tubes 37 may comprise any suitable number spaced vertically and horizontally as viewed in cross section in such a manner that they are accessible to the flames from the elongated flame source 39 located below the bank. In the present example, sixteen 2-inch internal diameter steel tubes 130 ft. long are spaced at about 4½-inch pitch in a square arrangement and supported in apertured spreader plates 40 which are positioned in notches or grooves 41 formed in the sides of the trough. The spreader plates 40 comprise a base section 40a having side grooved guide arms 40b which seat in the grooves 41, and a series of bars 40c the ends of which are located in the grooves of the guide arms 40b. The base section 40a and the bars 40c are provided with semicircular recesses 40d which co-operate to form the apertures for the vaporiser tubes 37. The bars 40c are retained in place by caps 40e bolted to the guide arms 40b.

The central longitudinal vertical plane of the bank of vaporiser tubes 37 is disposed in the corresponding plane of the trough 38 and on each side of the bank depending vertical plates or partitions 42 located in slots in the bars 40c are positioned between the spreader plates 40 to confine the flames on the one hand, and on the other to provide a pair of lateral channelways 43 for the ingress of air to the jet flames beneath the bank.

Below the bank and spaced therefrom with its axis in the central longitudinal vertical plane of the bank, a burner or heater tube 39 is positioned by a pair of jaws 45, 46, carried by the base section 40a of each spreader, one jaw 46 of which may be made removable for convenience in installation. The jaws 45, 46 and the sides of the tube may be provided with complementary engaging slot and projection means 47 to prevent the tube turning in the jaws while permitting longitudinal expansion and contraction movement.

The burner tube 39 has three parallel sets of longitudinally spaced jet orifices 48a, 48b, 48c (Figure 21) of about $\tfrac{1}{16}$ inch in diameter, the jets of the sets being arranged staggered so that the jets of all the sets are spaced about 4 inches apart longitudinally while the jets of each set are about 1 ft. apart.

One of the sets of jets 48b is in a longitudinal central plane of the bank and axis of the jet tube 39 so that the jets issuing from this set are directed vertically. The sets 48a, 48c on each side of the central set are spaced from the latter about $\tfrac{45}{64}$ of an inch measured circumferentially, and are bored to diverge outwardly, the angle being chosen such that the centres of the flames from these jets will normally pass inward of the outer tubes 37 of the lowest four of the bank.

Each vaporiser tube 37 is connected to a 1-inch diameter feed pipe 49 at one end so that fuel is supplied from a feed branch in parallel to all the tubes. The other ends of the tubes, with the exception of the pair 37a of the lowermost group of tubes which lies next the central vertical plane of the bank (see Figure 19), enter a common chamber 50 which acts as a mixing compartment and feeds the burner jet conduit 51 with fuel vapour. The two tubes 37a (excepted above) are bent downwardly at their ends and are connected to a cross tube 52 supplying fuel from the two tubes to the longitudinally extending heating or burner jet tube 39 referred to above, the other end of which is closed.

The burner jet conduit 51 is laid from the common chamber 50 either in direct longitudinal extension of the vaporiser element, along the burner lines planned for the landing strip, in which case the vaporiser jet flames also serve as part of the fog dispelling burner line, or if desired is bent and extends at a right-angle or other suitable angle with reference to the vaporiser element.

This conduit 51 is of 8-inch diameter mild steel (steam quality) piping laid in sections. Where very long lengths of conduit are employed the part away from the vaporiser element may be of smaller size (for example 6-inch diameter) to allow for the decreasing amount passing down the pipe. Along the conduit 51 are formed a continuous series of fog dispelling jet orifices about 1/10 of an inch diameter, which may be flared and spaced apart longitudinally about 3 in. in the 8-inch diameter length of the conduit, and is formed with a second series in the smaller diameter (6 in.) part of the conduit of orifices of 3/32 inch diameter spaced at 3 in. pitch. At intervals of about 25 yds. or so in the series double orifices are provided the axes of which converge towards one another so that the flames issuing therefrom impinge thereon bat's-wing fashion, the purpose of which is to facilitate the running ignition of the flame at starting or to relight any adjacent flames that may be temporarily extinguished.

The conduit 51 may be laid upon the ground surface but it is preferred to dispose of it in a concrete trough 152 sunk to substantially ground level so that the horizontal tangent at the top of the conduit 51 lies in the plane of the lips of the trough.

The trough 152 is about 13 in. width inside measurement and about 10 in. deep.

The conduit 51 is supported at intervals of about 15 ft. upon cross tubular members 53 of carriers 54 of H form which are sunk in the concrete and which are accommodated in grooves 55 in the side of a concrete channel formed partly in one section and partly in the other at the section joints. Retaining members 56 telescoping into the H members are provided having lips 57 which extend over the conduit 51 to counteract upward movement of the conduit 51 due to distortion caused by the heat.

The feed pipes 49 for the vaporiser tubes 37 are located in a concrete trough 156 closed by slabs 157 and bars 58 and are coupled to a main feed pipe 59.

The two vaporiser tubes 37a connected to the burner jet tube 39 are fed separately by pipes 49a connected to a main feed pipe 60.

The burner jet conduit 51 served by a vaporiser element may be from 300 yds. or more in extent, according to requirements and limitations imposed by condensation and this conduit carries the vapour supply for the burner jets. The end of the conduit 51 remote from the vaporiser is provided with a steel vessel for collecting condensate which forms during the starting up of the burner. The condensate collected in this vessel is disposed of, when necessary, either by means of pumping out the vessel or, alternatively, the vessel may be connected to a vaporising pipe or coil situated parallel with the burner pipe so that the heat therefrom will vaporise the condensate in the supplementary pipe or coil, which is burnt in an attached orificed auxiliary burner tube.

In installing independent vaporiser and burner conduit plant at the intersections of runways or elsewhere in positions in which it is essential that the burner flames can be extinguished immediately should it be necessary to pass aircraft over such locality, a by-pass and "blow down" line is suitably connected with the supply from the vaporiser feed chamber or with the burner jet conduit adjacent thereto, the connection being provided with a pair of inter-connected two-way valves. When these valves are in one position the vaporiser feeds straight through to the burner jet conduit, while when it is required to shut off the burner jet conduit completely, to extinguish the flames, the valves are operated to by-pass the vapour away from the burner jet conduit into the by-pass line and so that the burner jet conduit is vented down the "blow down" line.

The by-pass line is provided with jet orifices and is virtually a secondary burner. The vapour from the vaporiser element passes out through these orifices and idly burns, thus enabling the vaporiser to be shut down at leisure; or the burner jet conduit may be switched in again when only a temporary extinction of its flame is required.

At intersections of runways and the like the vaporiser element may conveniently be installed to lie at right-angles to the burner jet conduit, and instead of running in one direction the latter may extend in opposite directions away from the vaporiser element which serves both branches.

In order to provide readily transportable plant for rapid erection or temporary use, independent vaporiser and burner conduit plant may be provided comprising a relatively small vaporiser coil unit adapted for coupling with lengths of burner jet conduit of suitable diameter. In this example of the invention (see Figures 25–27) a vaporiser unit consists of six vaporiser helical coils 62 mounted upon a rectangular tubular frame 63 which also operates as a liquid fuel supply distributor for the coils, and is adapted to be laid on the ground with little or no preparation. Along each of the longer sides of the rectangular frame 63 the helical vaporiser coils (of about 9 inches in diameter) are mounted; for example, three coils 62 may be positioned at each side of the rectangle, coupled together in pairs by pipes 64 across the rectangle so that each coil of a pair functions in series, while the pairs are coupled to a frame tubing through the side 65. The burner jet tube 66 for providing the vaporising flame for the coils is located centrally of the rectangle 63 and is connected at one end to the pairs of coils by pipes 69. The burner tube 66 has two series of jet orifices 67 located upon either side of the longitudinal vertical plane containing the axis of the tube, the orifices being bored with their axes at about 25°–30° to the horizontal so as to direct the flame from one set of orifices towards one set of vaporiser coils and the other set of orifices is directed towards the other coils as indicated by the dot-and-dash lines in Figure 27.

The tubular frame 63 and burner tube 66 are connected to a feed line 68 for the fuel supplied from a main, and according to the preferred arrangement a burner assembly comprises two such framed coil units as described above, placed in longitudinal extension one of the other with a space between, which may be occupied by a U-shaped pipe feeding both elements from a feed pipe entering the U-shaped pipe T fashion.

At the opposite ends the vaporiser elements are connected to burner jet conduits 169 which may be laid in straight lines running away from the vaporiser elements and are connected to the vaporiser burner tube 66 by a cranked union 70, the whole being welded to the frame 63 by a strap 71. The conduit 169 comprises 2-inch inside dimension steel (steam quality) tubing, arranged in 20 ft. lengths, coupled together by unions. At the end or at intervals the conduit is provided with an apertured bracket 72 having feet or flanges which support the tubing upon the ground. The conduit fits slidably in the apertures in the brackets so that expansion may take place outwardly. At intervals of about 6 ft. 3 in. triple orifices may be provided for forming flames of bat's-wing type to facilitate the running ignition of the flame as in a previous modification.

The sections or lengths of burner jet conduit are provided with a series of vertical jet orifices 73 of about 1/16 inch diameter and the spacing interval is about 3 inches. The total length of a vaporiser element and its burner jet conduit is about 84 ft., of which 76 ft. is burner jet conduit while the remaining 8 ft. is occupied by the vaporiser element. Allowing for the space between vaporiser elements the overall dimensions of a pair of units is about 174 ft.

The whole installation is designed so that it can be moved, with all the necessary spares and erection tackle, on ordinary lorries, and weights can be kept within the capacity of three-ton lorries.

Each burner plant requires a storage reservoir for liquid fuel, conduits to pass liquid fuel to the pumping station and pumps necessary for establishing and maintaining the required pressures. Any appropriate form of various alternative layouts available of the main and distribution branches may be adopted, such as of the character indicated herein for supplying the burner jet piping or burner tubes of vaporiser elements with liquid fuel.

Thus, referring to Figure 2, which shows diagrammatically suitable controls for supplying fuel to the burners at the right-hand end of Figure 1, from the pump house 90 a pair of main pipe lines 91, 92 extend. The main 92 supplies four sub-main pipe lines 93, 94, 95, 96 which supply fuel to the units along the adjacent burner line 3 and certain of the units in burner line 5. These sub-main pipe lines 93 to 96 are controlled by hand-operated stop valves 97.

The main 91 extends to the other side of the landing strip 1 and supplies similar sub-mains 98, 99, 100, 101 under the control of hand-operated stop valves 102.

The main pipe line 92 also supplies a sub-main 103 under control of a hand-operated stop valve 104. From the sub-main 103 branch pipe lines 105, 106, 107, 108 supply under individual valve controls the units in the supplementary burner lines 5 on the near side, the units in the transverse double burner line 6, the double row of burner lines on the near side and outwardly of the burner line 6, and the units on the double transverse burner line 4.

The main pipe line 91 supplies a similar sub-main 109 under control of a hand-operated stop valve 110 from which branch lines 111, 112 which supply under individual valve controls, the units on the supplementary burner lines 5 on the far side, and the double row of burner lines on the far side and outwardly of the burner line 6.

The pipe lines 113 connected directly to individual sections of the burner lines are each provided with a valve 114 to give individual control for each section.

The controls on the liquid fuel supply for each unit or section of a fog dispelling burner line are provided with appropriate hand control cocks and with pressure responsive valves for regulating the supply of liquid fuel to a predetermined pressure (of, for example, 18 lbs. per sq. inch) or pressure range and for cutting off the supply should the pressure fall below a prescribed minimum during running or in shutting down the plant after the required run. Automatic valve controls may be provided including means susceptible of remote control whereby liquid fuel is supplied and flows to burner jets in a predetermined quantity measured by duration of flow or by the release of a metered quantity, for the purpose of providing a priming supply for initially heating up the vaporiser piping or tubes. When priming has been effected, which may be electrically indicated at a station remote from the burner lines, the jets of the burner lines or sections thereof may be lit in a continuous run or in a predetermined sequence, by electrical or other igniting devices operated either manually or automatically after a time interval following the commencement of priming.

Temperature responsive devices may be installed at suitable points in a burner line or at each section to indicate at a control station whether the burner line or section in the vicinity of the devices is alight or is extinguished.

Sections of burner piping or a burner jet conduit may be provided with vapour pressure responsive devices and remote indicating means to indicate the state of vapour pressure stage reached in starting up or the condition during operation.

In each of the plants described the flow of liquid fuel to the vaporising tubes or pipes may be controlled to prevent surging by the insertion of an orificed diaphragm at the feed junction, and similar orificed diaphragms may be located in burner jet pipes or conduits to control the rate of flow of fuel vapour.

If the wind and atmospheric conditions and factors governing any particular fog are known, then the heat output requirements necessary to disperse the fog could be forecast. In practice, however, it is scarcely possible to measure all the factors sufficiently quickly to apply the information, and in any case it will be evident that a great many varieties exist. Consequently the expedient of trial and observation of the dispersal produced should be adopted and tables for future guidance prepared.

In operation, having selected what burner lines or parts of lines will be required to deal with a fog under the prevailing wind and other conditions, the selected burners are primed. In the case of the triangular burner plant and the trough or trough slot burner plant, a priming quantity of liquid fuel is released and flows from the jets onto the ground or into the catchment trays and is subsequently ignited. When this fuel has all but been consumed, or after a predetermined time (found by experience) and vaporisation in the vaporiser piping is taking place sufficiently for the pumps to set to work to raise the pressure of the liquid fuel supply gradually in stages, and as the vaporised fuel burns at the jets and supplies more heat to the vaporiser piping, continuous vaporisation will become more perfect until the appropriate normal working pressure can be employed. An installation for a full-sized landing strip of 3,000 yds. with subsidiary runways may require 10–15 mins. in starting up.

Pressure is maintained at 18 lbs. per sq. inch or such other pressure as is appropriate for the particular plant in operation to secure the output predetermined or approximately estimated necessary to dispel the fog.

During operation adjustments may be made according to the observed results, both in the burner lines or sections ignited or in the pressure to alter the therm/yd./hr. output.

After the aircraft, for the guidance of which the installation has been put into operation, have been landed, the fuel pressure is gradually reduced and the operating valves are shut down manually or automatically when the pressure has fallen below the predetermined minimum.

In the operation of the independent vaporiser and burner conduit plant a similar procedure is pursued but in this case priming takes place at the vaporiser element and the ignition of the jet of the burner conduit takes place more gradually along the conduit, as the required vapour condition becomes established along the conduit.

When all the jets of the conduit are ignited the fuel pressure is raised in suitable stages and shutting down is effected by shutting of the controlling valves.

Substantially the same operation is carried out for the smaller or transportable independent vaporiser and burner conduit plant but as it is usually not necessary to provide this plant with automatic devices, the vaporiser element is ignited by hand and the control valves are operated manually.

We claim:

1. A fog freeable aircraft runway comprising a landing strip and burner lines extending longitudinally parallel with but spaced from said strip and transversely across the approaches to afford a linear heat source or frame by the consumption of fuel in the burner lines at a rate to develop that number of therms/yd./hr. capable of producing a fog-free tunnel or rift over the landing strip.

2. A runway as claimed in claim 1 wherein adjacent the approaches to the landing strip each of the burner lines extending longitudinally and transversely comprise a plurality of parallel burner pipe lines to secure increased fog dispersal.

3. A runway as claimed in claim 1 wherein the burner lines extending transversely each comprise burner pipe lines across the ends of the landing strip and burner pipe lines extending transversely across the strip and spaced from the pipe lines across the ends of the strip, the arrangement being such that the said transverse burner pipe lines together with the adjacent portions of the said longitudinal burner lines constitutes a box form in plan.

4. Plant for a fog freeable runway as claimed in claim 1 wherein the burner lines which extend longitudinally of the runway each comprise a series of aligned burner units, each consisting of rectilinear lengths of burner piping having a series of fog dispelling flame jet orifices, vaporiser piping above and coextensive with said burner piping, the vaporiser piping being disposed and the said jet orifices being directed to cause the fog dispelling flames to impinge upon the vaporiser piping to vaporise fuel passing to the burner piping, fuel supply branch piping coupled to the vaporiser piping of each unit, and continuous fuel supply piping coextensive with the said burner lines and coupled at intervals to the said branch piping for supply of fuel thereto.

5. Plant as claimed in claim 4 wherein the said vaporiser piping comprises pipes extending in opposite directions from the said supply branch piping.

6. Plant as claimed in claim 5 wherein each burner unit is composed of two sections extending in opposite directions, each section comprising a pair of parallel jet orificed burner pipes closed at the adjacent ends of the sections, a vaporiser pipe extending longitudinally in the mid-vertical plane between said burner pipes and at a level above them to constitute a triangular arrangement of burner and vaporiser piping as viewed in cross section, a header at the outer end of each section to which both the burner and vaporiser pipes are coupled and branch supply piping coupled to the vaporiser piping at the adjacent ends of each section.

7. Plant as claimed in claim 6 and comprising a series of spreaders having a triangular arrangement of pipe receiving apertures for locating and supporting the burner and vaporiser pipes at intervals longitudinally and anchorage means for fixing the outward ends of the burner sections in relation to the ground.

8. Plant for a fog freeable runway as claimed in claim 1 and comprising heat conserving metal troughing for location below ground level on the lines for the burners, burner line components in the form of flame jet orificed piping and vaporiser piping in the troughing, supporting means within the troughing for disposing the vaporiser piping above the burner piping and such that the jet flames impinge on the vaporiser piping as well as serving for fog dispelling purposes, and wheeled traffic supporting grids covering said troughing and burner piping.

9. Plant as claimed in claim 8 wherein the burner and vaporiser piping comprise burner piping closed at one end and vaporiser piping connected to the burner piping at the other end of the burner piping to form a U-shaped element, the limbs of which lie in the mid-vertical plane of the troughing with the vaporiser piping above the burner piping so as to be impinged by the burner jet flames, and a fuel supply branch coupled to the free end of the vaporiser piping.

10. Plant as claimed in claim 9 and comprising partition members positioned in parallel spaced relationship with the mid-vertical plane of said troughing and the marginal edges of the troughing, to facilitate the induction of supplementary combustion air between said partitions and the trough margins.

11. Plant as claimed in claim 10 wherein the burner and vaporiser piping is disposed in units each having two of the said U-shaped elements extending in opposite directions from the branch supply piping which is disposed between the inward ends of the U forms.

12. Plant as claimed in claim 11 wherein the partition members are formed as longitudinal bars of the wheeled traffic supporting grid.

13. Plant for a fog freeable runway as claimed in claim 1, comprising a burner conduit having a longitudinal series of fog dispelling flame jet orifices and extending in a length along a suitable portion of a burner line, an independent tubular vaporiser for supplying vaporised fuel to the burner conduit and including jet orificed heater tubing and vaporiser tubing above the heater tubing coupled to said burner conduit.

14. Plant for a fog freeable runway as claimed in claim 1, comprising a burner conduit having a longitudinal series of fog dispelling flame jet orifices and extending in a length along a suitable portion of a burner line, an independent vaporiser for supplying vaporised fuel to the burner conduit and including a bank of spaced vaporiser tubes, a jet orificed heater tube below said vaporiser tubes and to which certain of said vaporiser tubes are connected, a mixing chamber at one end of the bank to which chamber those vaporiser tubes not connected to the heater tubes are coupled, a connection coupling the mixing chamber to the burner conduit and fuel supply connections for the vaporiser tubes at the end remote from said mixing chamber.

15. Plant as claimed in claim 14 wherein the bank of vaporiser tubes and the heater tubes are located in a heat conserving trough, and wherein vertical partitions are positioned longitudinally between the sides of the bank and the trough walls to confine the flames of the heater tube jets and to afford lateral ingress for supplementary combustion air.

16. Plant for a fog freeable runway as claimed in claim 1 wherein the burner lines for the runway comprise lengths of fog dispelling flame jet orificed piping or conduit extending longitudinally along said lines and having stabilising jets spaced at intervals along said piping, each stabilising jet being formed by a pair of orifices inclined towards each other, for reigniting adjacent fog dispelling jet flames extinguished by wind, and vaporiser piping for supplying vaporised fuel to said jet orificed piping or conduit.

17. Plant for a fog freeable runway as claimed in claim 16 wherein the stabilising jets each comprise a pair of orifices inclined towards each other to produce a flame spreading longitudinally of the piping for reigniting adjacent fog dispelling jet flames extinguished by wind.

18. An installation for a runway for rendering it free of fog for aircraft alighting purposes comprising: burner piping having a longitudinal series of fog dispelling flame jet orifices, the said burner piping being arranged in lines parallel with and at the sides of the landing strip of said runway, burner piping having a series of fog dispelling flame jet orifices arranged transversely at the ends of said landing strip, pipe lines for supplying fuel to the said longitudinal and transverse burner lines, the arrangement being such that the said burner piping provides heat sources by the consumption of fuel in the burner piping by aid of the jet orifices at a rate to develop that number of therms/yd./hr. capable of producing a fog-free tunnel or rift over the strip.

ARTHUR CLIFFORD HARTLEY.
JOHN CECIL BROWN.
GUY STEWART CALLENDAR.
HANS REINHARD FEHLING.
DENYS ANTHONY FOX.
FRANK GILL.
WILLIAM THOMAS MOORE.
PAUL OTTO ROSIN.
GERALD JOHNSTONE WILLIAMSON.

REFERENCES CITED

The following references are of record in the file of this patent:

UNITED STATES PATENTS

| Number | Name | Date |
| --- | --- | --- |
| 401,258 | Drake | Apr. 9, 1889 |
| 966,395 | Gothan | Aug. 2, 1910 |
| 1,030,211 | Stratton | June 18, 1912 |
| 1,322,771 | Eisenbach | Nov. 25, 1919 |